United States Patent
Kowalski

(10) Patent No.: US 8,112,041 B2
(45) Date of Patent: Feb. 7, 2012

(54) SYSTEMS AND METHODS FOR GENERATING SEQUENCES THAT ARE NEAREST TO A SET OF SEQUENCES WITH MINIMUM AVERAGE CROSS-CORRELATION

(75) Inventor: John M. Kowalski, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 324 days.

(21) Appl. No.: 12/530,761

(22) PCT Filed: Mar. 13, 2008

(86) PCT No.: PCT/JP2008/055154
§ 371 (c)(1),
(2), (4) Date: Sep. 10, 2009

(87) PCT Pub. No.: WO2008/114837
PCT Pub. Date: Sep. 25, 2008

(65) Prior Publication Data
US 2010/0097922 A1    Apr. 22, 2010

(51) Int. Cl.
*H04B 17/00*    (2006.01)
(52) U.S. Cl. .................. 455/67.11; 455/101; 455/226.1; 370/203
(58) Field of Classification Search ...... 455/67.11–67.16, 455/226.1–226.4, 101, 274, 275, 276.1, 277.1, 455/277.2, 278.1; 370/203, 208, 209, 210; 375/296–297
See application file for complete search history.

(56) References Cited

U.S. PATENT DOCUMENTS

| | | | |
|---|---|---|---|
| 7,145,940 B2 | 12/2006 | Gore et al. | |
| 7,170,926 B2 | 1/2007 | Zeira | |
| 7,173,899 B1 | 2/2007 | Rupp | |
| 7,173,973 B2 | 2/2007 | Borran et al. | |
| 7,539,263 B2 | 5/2009 | Jung et al. | |
| 7,848,448 B2 | 12/2010 | Han et al. | |
| 2002/0141367 A1 | 10/2002 | Hwang et al. | |
| 2003/0086363 A1 | 5/2003 | Hernandez | |
| 2004/0081074 A1 | 4/2004 | Piechocki | |
| 2004/0146024 A1 | 7/2004 | Li et al. | |
| 2004/0213326 A1 | 10/2004 | Parizhsky et al. | |
| 2006/0239336 A1 | 10/2006 | Baraniuk et al. | |
| 2006/0247898 A1 | 11/2006 | Cha | |

(Continued)

FOREIGN PATENT DOCUMENTS

AU    759855    11/2002

(Continued)

OTHER PUBLICATIONS

Notice of Allowance issued for U.S. Appl. No. 11/851,077 on Apr. 29, 2011.

(Continued)

*Primary Examiner* — Lana N Le
(74) *Attorney, Agent, or Firm* — Austin Rapp & Hardman

(57) ABSTRACT

A method for generating sequences that are nearest to a set of sequences with minimum average cross-correlation is described. Each element of a set of sequences is projected to a nearest constellation point. The set of sequences is converted into a time domain representation. An inverse discrete Fourier Transform (IDFT) is performed on the set of sequences. A cubic metric of each sequence of the set of sequences is evaluated. A sequence is removed from the set if the cubic metric exceeds a threshold. A minimum maximum cross-correlation is obtained for the set of sequences.

5 Claims, 11 Drawing Sheets

U.S. PATENT DOCUMENTS

| | | | |
|---|---|---|---|
| 2007/0006794 | A1 | 1/2007 | Swenson et al. |
| 2007/0183386 | A1 | 8/2007 | Muharemovic et al. |
| 2007/0230600 | A1 | 10/2007 | Bertrand et al. |
| 2007/0253476 | A1 | 11/2007 | Tirkkonen et al. |
| 2007/0297381 | A1 | 12/2007 | Oketani et al. |
| 2008/0075184 | A1 | 3/2008 | Muharemovic et al. |
| 2008/0129560 | A1 | 6/2008 | Baraniuk et al. |
| 2008/0159436 | A1 | 7/2008 | Cho et al. |
| 2008/0225688 | A1 | 9/2008 | Kowalski |
| 2008/0232300 | A1 | 9/2008 | McCoy et al. |
| 2008/0235314 | A1 | 9/2008 | Lee et al. |
| 2008/0310383 | A1 | 12/2008 | Kowalski |
| 2009/0046629 | A1 | 2/2009 | Jiang et al. |
| 2009/0067318 | A1 | 3/2009 | Kowalski |
| 2009/0110034 | A1 | 4/2009 | Kowalski |
| 2009/0123048 | A1* | 5/2009 | Leroux et al. ............. 455/67.11 |
| 2009/0135791 | A1 | 5/2009 | Kawamura et al. |
| 2010/0172439 | A1* | 7/2010 | Kowalski ..................... 375/296 |
| 2010/0177834 | A1* | 7/2010 | Kowalski ..................... 455/101 |
| 2010/0195566 | A1 | 8/2010 | Krishnamurthy et al. |
| 2010/0272192 | A1 | 10/2010 | Varadarajan et al. |
| 2010/0290546 | A1 | 11/2010 | Kowalski |

FOREIGN PATENT DOCUMENTS

| | | |
|---|---|---|
| AU | 3139502 | 11/2002 |
| CA | 2 611 157 A1 | 12/2006 |
| CA | 2380039 | 10/2008 |
| CN | 1380765 | 11/2002 |
| DE | 60209392 | 8/2006 |
| DE | 20221616 | 10/2006 |
| EP | 1248485 | 10/2002 |
| EP | 1 898 542 A1 | 3/2008 |
| JP | 2002-369258 | 12/2002 |
| JP | 2006-203945 | 8/2006 |
| JP | 2006-295629 | 10/2006 |
| JP | 2006-295629 A | 10/2006 |
| JP | 2007-89108 | 4/2007 |
| KR | 10-2002-0079453 | 10/2002 |
| WO | 2006/134949 | 12/2006 |
| WO | 2007/023767 | 3/2007 |

OTHER PUBLICATIONS

Notice of Acceptance issued for Australian Patent Application No. 2008227399 on May 2, 2011.
Co-pending U.S. Appl. No. 11/928,092, filed Oct. 30, 2007, Kowalski.
Co-pending U.S. Appl. No. 12/530,742, filed Sep. 10, 2009, Kowalski.
Co-pending U.S. Appl. No. 11/686,251, filed Mar. 14, 2007, Kowalski.
Co-pending U.S. Appl. No. 11/851,077, filed Sep. 6, 2007, Kowalski.
Co-pending U.S. Appl. No. 12/676,485, filed Jun. 3, 2010, Kowalski.
Sharp, "Summary Results on OZCL Sequences for UL RS for LTE," 3GPP TSG-RAN WG1 #50, R1-073319, Aug. 2007.
Sharp, "Optimized UL RS Design—OZCL Sequences," 3GPP TSG-RAN WG1 #48bis, R1-072053, May 2007.
J. Coon et al., "Optimal Training Sequences for Channel Estimation in Cyclic-Prefix-Based Single-Carrier Systems with Transmit Diversity," IEEE Signal Processing Letters, vol. 11, No. 9, Sep. 2004, pp. 729-732.
L.R. Welch, "Lower Bounds on the Maximum Cross-Correlation of Signals," IEEE Transactions on Information Theory, vol. IT-20, No. 3, May 1974, pp. 397-399.
B. Popovic, "Generalized Chirp-Like Polyphase Sequences with Optimum Correlation Properties," IEEE Transactions on Information Theory, vol. 38, No. 4, Jul. 1992, pp. 1406-1409.
S. Boyd and L. Vandenberghe, "Convex Optimization", 2004, p. 634, Cambridge University Press, Cambridge.
R.M. Gray, "Toeplitz and Circulant Matrices: A Review," http://ee.stanford.edu~gray/teoplitz.pdf, Jun. 28, 2007.
Motorola, "Uplink Reference Signal Generation Methods," 3GPP RAN WG1 #47bis, R1-070152, Jan. 2007.
NEC Group, "Citeria to decide Zadoff-Chu sequence length for EUTRA uplink reference signal," 3GPP TSG RAN WG1 Meeting #48, R1-070877, Feb. 2007.
Motorola, "Cubic Metric in 3GPP-LTE," 3GPP TSG RAN WG1 LTE Adhoc, R1-060023, Jan. 2006.
Motorola, "Proposal for UL DM RS for 1 and 2 RB Allocation," 3GPP TSG RAN1 Email Reflector, Sep. 2007.
Qualcomm Europe, "Uplink RS for Small Resource Block Allocation," 3GPP TSG RAN1 #50, R1-07xxxx, Aug. 2007.
Texas Instruments, "Design of CG Sequences for Small RB Allocations in E-UTRA UL," 3GPP TSG RAN WG1 #50bis, R1-07abcd, Oct. 2007.
Texas Instruments, "Design of CAZAC Sequences for Small RB Allocations in E-UTRA UL," 3GPP RAN WG1 #49bis, R1-072848, Jun. 2007.
Motorola, "UL RS Generation for E-UTRA," 3GPP RAN WG1 #50, R1-073754, Aug. 2007.
Y. Linde, A. Buzo, and R.M. Gray, "An Algorithm for Vector Quantizer Design," IEEE Trans. Commun. vol. Com-28, No. 1, Jan. 1980, pp. 84-98.
P. Xia, S. Zhou, G. Giannakis, "Achieving the Welch Bound with Different Sets," IEEE Trans. Information Theory, vol. 51, No. 5, May 2005, pp. 1900-1907.
Texas Instruments, "Design of CAZAC Sequences for Small RB Allocations in E-UTRA UL," 3GPP TSG RAN WG1 #49, R1-072206, May 2007.
International Search Report issued for International Patent Application No. PCT/JP2008/055157on May 20, 2008.
Written Opinion issued for International Patent Application No. PCT/JP2008/055157on May 20, 2008.
Written Opinion issued for International Patent Application No. PCT/JP2008/055154 on Jun. 24, 2008.
International Search Report issued for International Patent Application No. PCT/JP2008/066481 on Dec. 22, 2008.
Notice of Allowance issued for U.S. Appl. No. 11/851,077 on Jan. 25, 2011.
Office Action issued for U.S. Appl. No. 11/928,092 on Mar. 4, 2011.
Sharp, "UL RS via OZCL Sequences," 3GPP TSG-RAN WG1 #49bis, R1-072719, Jun. 25, 2007.
Sharp, "Summary Results on OZCL Sequences for UL RS for LTE, " 3GPP TSG-RAN WG1 #50, R1-073319, Aug. 24, 2007.
Sharp, "Optimized UL RS Design—OZCL Sequences," 3GPP TSG-RAN WG1 #48bis, R1-072053, May 11, 2007.
Joel A. Tropp et al., "Designing Structured Tight Frams via an Alternating Projection Method," IEEE Transactions on Information Theory, vol. 51, No. 1, pp. 188-209, Jan. 2005.
J.Coon et al., "Optimal Training Sequences for Channel Estimation in Cyclic-Prefix-Based Single-Carrier Systems with Transmit Diversity," IEEE Signal Processing Letters, vol. 11, No. 9, Sep. 2004, pp. 729-732.
R.M. Gray, "Toeplitz and Circulant Matrices: a Review," http://ee.stanford.edu/~gray/teoplitz.pdf, Jun. 28, 2007.
Motorola, "Uplink Reference Signal Generation Methods," 3GPP RAN WG1 #47bis, R1-070152, Jan. 19, 2007.
NEC Group, "Citeria to decide Zadoff-Chu sequence length for EUTRA uplink reference signal," 3GPP TSG RAN WG1 Meeting #48, R1-070877, Feb. 16, 2007.
Motorola, "Cubic Metric in 3GPP-LTE," 3GPP TSG RAN WG1 LTE Abhoc, R1-060023, Jan. 26, 2006.
Motorola, "Proposal for UL DM RS for 1 and 2 RB Allocation," 3GPP TSG RAN1 Email Reflector, Sep. 7, 2007.
Qualcomm Europe, "Uplink RS for Small Resource Block Allocation," 3GPP TSG RAN1 #50, R1-07xxxx, Aug. 24, 2007.
Texas Instruments, "Design of CG Sequences for Small RB Allocations in E-UTRA UL," 3GPP TSG RAN WG1 #50bis, R1-07abcd, Oct. 12, 2007.
International Search Report issued for International Patent Application No. PCT/JP2008/055154 on Jun. 24, 2008.
Co-pending U.S. Appl. No. 12/530,742, filed Sep. 10, 2009, Sharp Kabushiki Kaisha.
International Search Report issued for International Patent Application No. PCT/JP2008/055157 on May 20, 2008.
U.S. Appl. No. 11/764,061, filed Jun. 15, 2007, Kowalski.

U.S. Appl. No. 12/664,367, filed Dec. 11, 2009, Kowalski.
Dilip Sarwate, "Bounds on Crosscorrelation and Autocorrelation of Sequences,"IEEE trans. Information Theory, vol. IT-25, No. 6, Nov. 1979, pp. 720-724.
R1-071494, "Optimized UL RS Design, and some issues with current UL RS proposals,"Sharp, Mar. 2007.
R1-072210, ACK/NAK and CQI Multiplexing Capacity and Performance in E-UTRA UL, 3GPP Submission from TI, May 2007.
Draft Report of 3GPP TSG RAN WG1 #40 v0.3.0m Jun. 2007.
J.A. Tropp et al., "Applications of Sparse Approximation in Communications," IEEE Transactions on Information Theory, ISIT 2005, Proceedings. International Symposium on Sep. 9, 2005, pp. 1000-1004.
J.A. Tropp et al., "Simultaneous Sparse Approximation via Greedy Pursuit," IEEE Transactions on Information Theory, ISIT 2005, Proceedings. International Symposium, pp. 721-724.
Office Action issued for U.S. Appl. No. 11/686,251 on Aug. 19, 2011.
Office Action issued for U.S. Appl. No. 11/928,092 on Sep. 2, 2011.
Office Action issued for U.S. Appl. No. 11/764,061 on Oct. 4, 2010.
Office Action issued for U.S. Appl. No. 11/764,061 on Mar. 10, 2011.
Office Action issued for U.S. Appl. No. 11/764,061 on Jun. 24, 2011.
International Search Report issued for International Patent Application No. PCT/JP2008/061286 on Aug. 19, 2008.
International Preliminary Report on Patentability issued for International Patent Application No. PCT/JP2008/061286 on May 22, 2009.

* cited by examiner

SYSTEMS AND METHODS FOR GENERATING SEQUENCES THAT ARE NEAREST TO A SET OF SEQUENCES WITH MINIMUM AVERAGE CROSS-CORRELATION

RELATED REFERENCES

This application is the national phase under 35 U.S.C. §371 of PCT International Application No. PCT/JP2008/055154 with an International Filing Date of Mar. 13, 2008, which claims the benefit of U.S. patent application Ser. No. 11/686,251, entitled "SYSTEMS AND METHODS FOR IMPROVING REFERENCE SIGNALS FOR SPATIALLY MULTIPLEXED CELLULAR SYSTEMS" filed on Mar. 14, 2007.

Further, PCT International Application No. PCT/JP2008/055154, mentioned above, also claims the benefit of U.S. patent application Ser. No. 11/928,092, entitled "SYSTEMS AND METHODS FOR GENERATING SEQUENCES THAT ARE NEAREST TO A SET OF SEQUENCES WITH MINIMUM AVERAGE CROSS-CORRELATION" filed on Oct. 30, 2007.

TECHNICAL FIELD

The present invention relates generally to computers and computer-related technology. More specifically, the present invention relates to systems and methods that improve the design of reference signals for spatially multiplexed cellular systems.

Further, The present invention relates generally to computers and computer-related technology. More specifically, the present invention relates to systems and methods for generating sequences that are nearest to a set of sequences with minimum average cross-correlation.

BACKGROUND ART

A wireless communication system typically includes a base station in wireless communication with a plurality of user devices (which may also be referred to as mobile stations, subscriber units, access terminals, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multi-tone transmission (DMT).

The $3_{rd}$ Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

Wireless communications systems (e.g., Time Division Multiple Access (TDMA), Orthogonal Frequency-Division Multiplexing (OFDM)) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc. Wireless communication systems may include one or more mobile stations and one or more base stations that each transmit a reference signal. Reference signals may be designed such that a mobile station may re-use a reference signal that was previously used by a different mobile station. However, a set of sequences used for multiple carrier transmission of reference signals for demodulation may increase storage requirements because there is no minimum cross-correlation. As such, benefits may be realized by providing systems and methods for generating sequences that are nearest to a set of sequences with minimum average cross-correlation.

DISCLOSURE OF INVENTION

A method to generate sequences used for wireless communication systems is described. Initial sequences are set to a first set of sequences. A second set of sequences is obtained by projecting the first set of sequences to a space of tight frames. A third set of sequences is obtained by projecting each of subsets of the second set of sequences to a space of orthogonal matrices. A forth set of sequences is obtained by projecting the third set of sequences to a space of circulant matrices. A fifth set of sequences is obtained by projecting the forth set of sequences to a space of matrices with preferable PAPR. Said steps are iterated at least once by setting the fifth set of sequences to the first set of sequences. A sixth set of sequences is obtained by projecting each element of the fifth set of sequences after the iterating step has been executed to a nearest quadrature phase-shift keying (QPSK) constellation point. The sixth set of sequences is outputted.

A method for generating sequences that are nearest to a set of sequences with minimum average cross-correlation is described. Each element of a set of sequences is projected to a nearest constellation point. The set of sequences is converted into a time domain representation. An inverse discrete Fourier Transform (IDFT) is performed on the set of sequences. A cubic metric of each sequence of the set of sequences is evaluated. A sequence is removed from the set if the cubic metric exceeds a threshold. A minimum maximum cross-correlation is obtained for the set of sequences.

A communications device that is configured to generate sequences that are nearest to a set of sequences with minimum average cross-correlation is also described. The communications device includes a processor and memory in electronic communication with the processor. Instructions are stored in the memory. Each element of a set of sequences is projected to a nearest constellation point. The set of sequences is converted into a time domain representation. An inverse discrete Fourier Transform (IDFT) is performed on the set of sequences. A cubic metric of each sequence of the set of sequences is evaluated. A sequence is removed from the set if the cubic metric exceeds a threshold. A minimum maximum cross-correlation is obtained for the set of sequences.

A computer-readable medium that includes executable instructions is also described. Each element of a set of sequences is projected to a nearest constellation point. The set of sequences is converted into a time domain representation. An inverse discrete Fourier Transform (IDFT) is performed on the set of sequences. A cubic metric of each sequence of the set of sequences is evaluated. A sequence is removed from the set if the cubic metric exceeds a threshold. A minimum maximum cross-correlation is obtained for the set of sequences.

Several exemplary examples are now described with reference to the Figures. This detailed description of several exemplary examples, as illustrated in the Figures, is not intended to limit the scope of the claims.

BRIEF DESCRIPTION OF DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

BEST MODE FOR CARRYING OUT THE INVENTION

Figure 1:
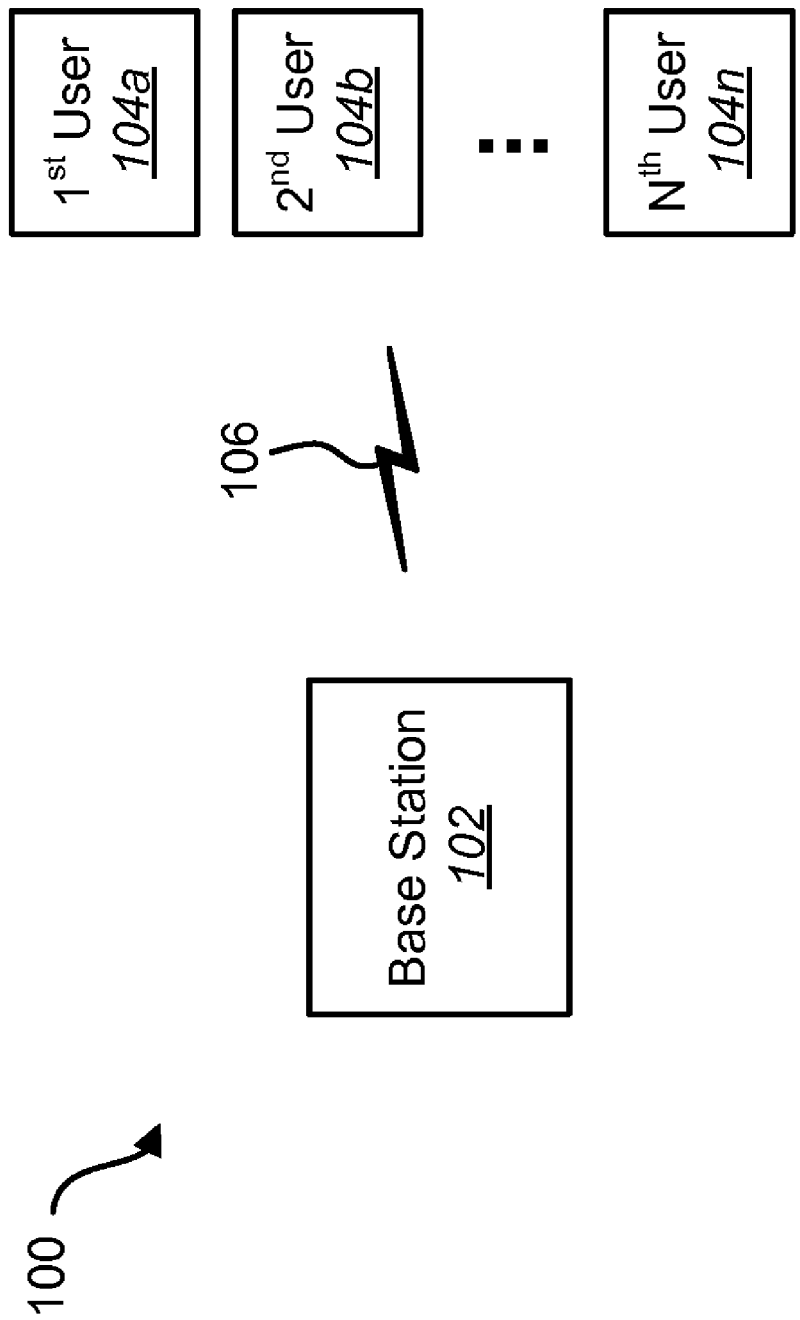
FIG. 1 illustrates an exemplary wireless communication system in which examples may be practiced.

As used herein, the terms "an example," "example," "examples," "the example," "the examples," "one or more examples," "some examples," "certain examples," "one example," "another example" and the like mean "one or more (but not necessarily all) examples," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Reference signals may be used in communication systems. Reference signals may include a single frequency and are transmitted over the communication systems for supervisory, control, equalization, continuity, synchronization, etc. Communication systems may include one or more mobile stations and one or more base stations that each transmit a reference signal. Reference signals may be designed such that a mobile station may re-use a reference signal that was previously used by a different mobile station or is used at the same time at another mobile station in another cell far enough apart so as to negligibly interfere. Truncation or cyclic extension of a particular set of Zadoff-Chu sequences has been utilized to design reference signals for re-use. However, truncation or cyclic extension may result in a tedious integer programming problem for a sequence assignment. In addition, a guarantee of minimal correlation does not exist when truncation or cyclic extension of a particular set of Zadoff-Chu sequences are implemented. Further, because of variable correlation properties of candidate proposed reference signals, detailed planning regarding the mobile station may be done which may be particularly vexing if adjacent networks exist in the same band that are operated by different operators.

The present systems and methods design reference signals for multiple input multiple output (MIMO) systems in which reference signals are allocated amongst one or more mobile stations, for use in single user or multiple user MIMO systems. In one example, the present systems and methods design uplink reference signals in a cellular system. Communications from mobile stations to base stations may be classified as "uplink" communications. Conversely, communications from base stations to mobile stations may be classified as "downlink" communications. Transmitting uplink reference signals in a cellular system may pose stringent requirements on time and frequency resources on the mobile station. These stringent requirements may impede an optimum design of the reference signals for the mobile station, which may desire to implement a single or multiple carrier modulation with cyclic prefix, where there is synchronization between the transmission of multiple uplink signals and their respective base stations and where sectorization amongst cells of mobile stations is employed to maximize the capacity per cell. In addition, the present systems and methods employ multiple bandwidth allocations simultaneously to multiple base stations. In one example, each bandwidth segment allocated to a mobile station is an integer amount of some basic unit.

In designing a set of reference signals, certain design considerations may be implemented. For example, the set may be large enough to cover at least three sectors per cell, with at least two reference signals per sector. In one example, four reference signals per sector are present. A further design consideration may be that the set of reference signals may be orthogonal in each sector of a given cell. The set of reference signals may also be orthogonal in all sectors adjacent to a given sector. If the reference signals are orthogonal and the reference signals are known to adjacent sectors, a best minimum mean square receiver may be designed and implemented.

For those reference signals that are not in adjacent sectors, or which are not orthogonal, another design consideration may be that these reference signal are minimally correlated, with approximately the same correlation, and approach (if not meet) the Welch Bound. Sets of sequences that approach or meet the Welch Bound may denote a tight frame, where each vector possesses a unit norm, i.e., $\|\chi\eta\|_2 = 1$. A further design consideration is the set of reference signals may also have a Peak to Average Power Ratio (PAPR) that approaches (if not equal) to 1. The PAPR may be defined as, for a sequence vector c as:

$$P = \frac{\|c\|_\infty^2}{c^H c},$$ (Equation 1)

where $\|c\|_\infty^2$ denotes the square maximum modulus component of c and where $(\ )^H$ denotes a conjugate transpose.

Another example of a design consideration may be that amongst subsets of sequences with orthogonal elements, each element may be a cyclic shift of another element. This property may be useful to provide robust performance if a transmission system which transmits a cyclic prefix for multipath elimination encounters multipath components with a delay spread greater than the cyclic prefix length. An additional design consideration is that in a system where multiple bandwidths are employed simultaneously, the set of reference signal sequences may be recursively generated from a base sequence.

In one example, the amount of reference signal space (time and frequency resources) may be exactly large enough. For example, the basic unit of bandwidth allocation may allow for 19 or any larger prime number of reference signals available for two reference signals per sector. In a further example, the basic unit of bandwidth allocation may allow for 37 or any larger prime number of reference signals for four reference signals per sector. As in this case, if the amount of reference signal space is exactly large enough, Zadoff-Chu sequences may be taken as the reference sequences as they meet the design considerations previously described. However, such resource availability or sequence numerology may not be plausible. The present systems and methods provide an algorithm for designing reference signals based on alternating projections when such resources or sequence numerology are not available.

In addition, the present systems and methods minimize the storage taken up by a set of sequences used for multiple carrier transmission of reference signals for demodulation that are designed to have minimum cross-correlation, subject to a cubic metric parameter. The set of sequences may be represented in the frequency domain prior to an inverse discrete Fourier Transform (IDFT). The IDFT may produce a time-domain waveform that is utilized to estimate channel characteristics for proper signal demodulation.

FIG. 1 illustrates an exemplary wireless communication system 100 in which examples may be practiced. A base station 102 is in wireless communication with a plurality of user devices 104 (which may also be referred to as mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "OFDM transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
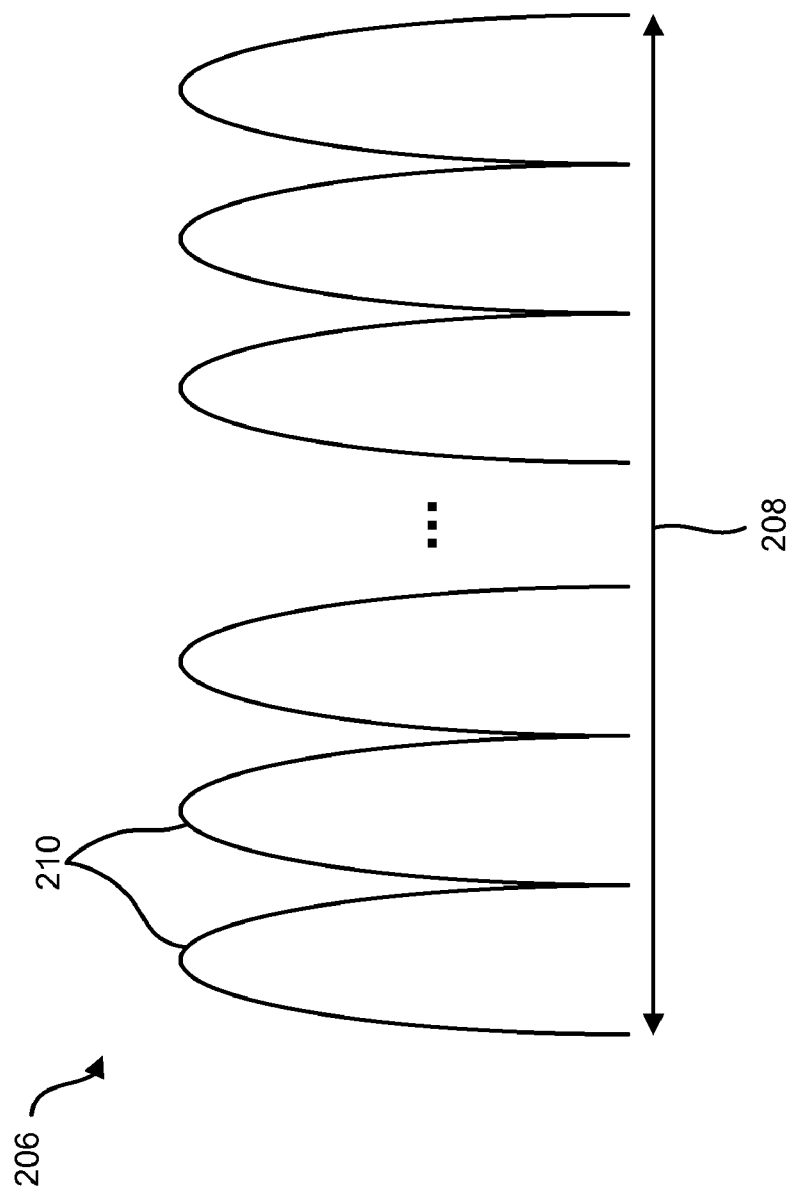
FIG. 2 illustrates some characteristics of a transmission band of an RF communication channel in accordance with an OFDM-based system.

FIG. 2 illustrates some characteristics of a transmission band 208 of an RF communication channel 206 in accordance with an OFDM-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier.

Figure 3:
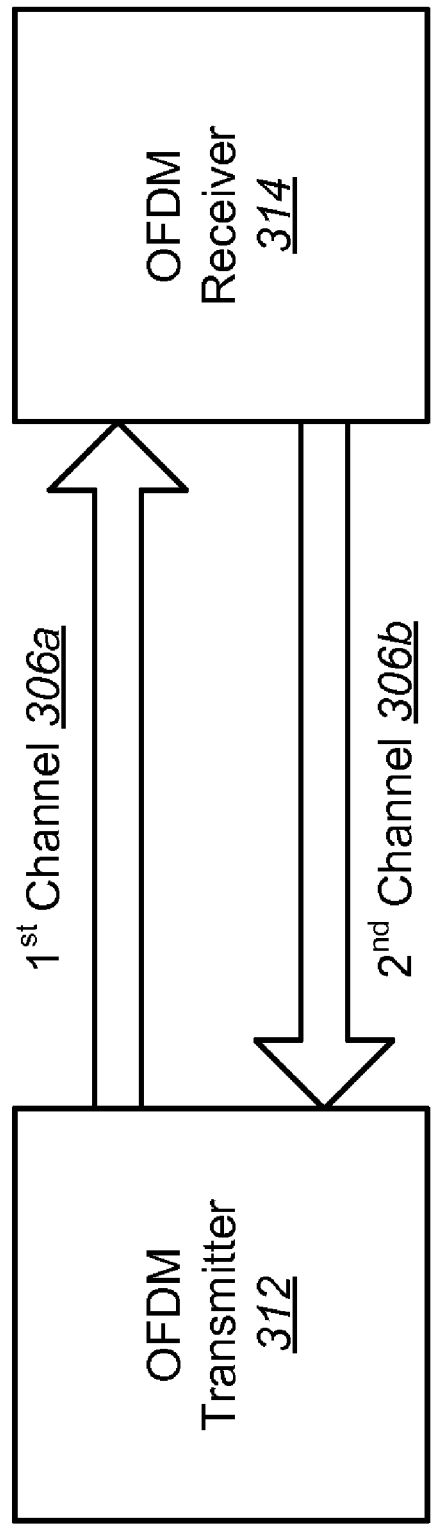
FIG. 3 illustrates communication channels that may exist between an Orthogonal frequency division multiplexing (OFDM) transmitter and an OFDM receiver according to an example.

FIG. 3 illustrates communication channels 306 that may exist between an OFDM transmitter 312 and an OFDM receiver 314 according to an example. As shown, communication from the OFDM transmitter 312 to the OFDM receiver 314 may occur over a first communication channel 306a. Communication from the OFDM receiver 314 to the OFDM transmitter 312 may occur over a second communication channel 306b.

The first communication channel 306a and the second communication channel 306b may be separate communication channels 306. For example, there may be no overlap between the transmission band of the first communication channel 306a and the transmission band of the second communication channel 306b.

In addition, the present systems and methods may be implemented with any modulation that utilizes multiple antennas/MIMO transmissions. For example, the present systems and methods may be implemented for MIMO Code Division Multiple Access (CDMA) systems or Time Division Multiple Access (TDMA) systems.

Figure 4:
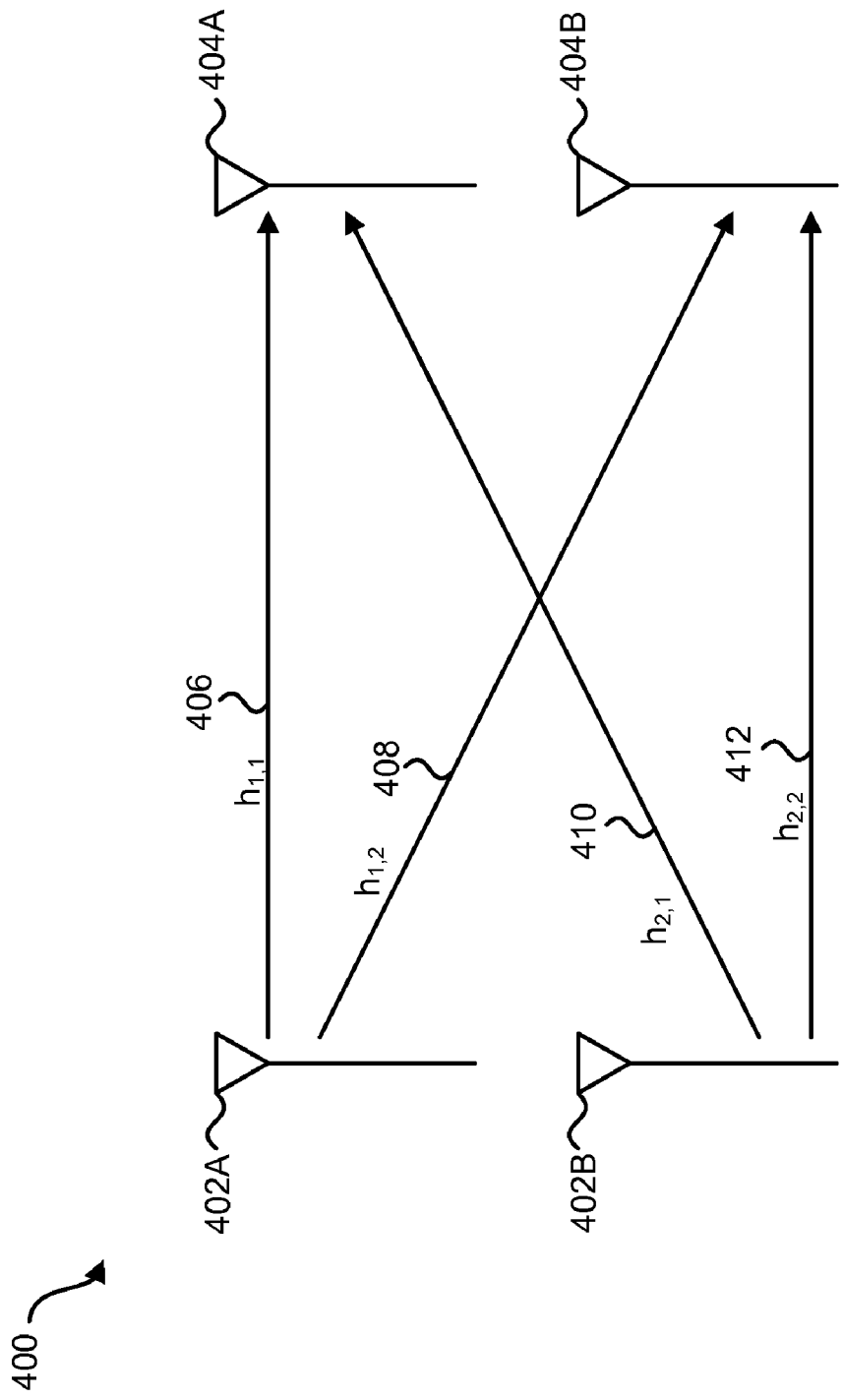
FIG. 4 illustrates one example of a multiple input multiple output (MIMO) system that may be implemented with the present systems and methods.

FIG. 4 illustrates one example of a MIMO system 400 that may be implemented with the present systems and methods. The illustrated MIMO system 400 includes a first transmit antenna ($Tx_1$) 402A and a second transmit antenna ($Tx_2$) 402B. The system 400 also includes a first receive antenna ($Rx_1$) 404A and a second receive antenna ($Rx_2$) 404B. The transmit antennas 402A, 402B may be used to transmit a signal 406, 408, 410, 412 to the receive antennas 404A, 404B.

In single antenna systems, multi-path propagation may be detrimental to the performance of the system. The multiple propagation paths may cause "copies" of a signal to arrive at a receiver at slightly different times. These time delayed signals may then become interference when trying to recover the signal of interest. The MIMO system 400 is designed to exploit the multi-path propagation to obtain a performance improvement. For example, the first receive antenna ($Rx_1$) 404A may receive a mixture of a first signal 406 and a third signal 410 which are sent from the first transmit antenna ($Tx_1$) 402A and the second transmit antenna ($Tx_2$) 402B. The first and third signals 406, 410 may be sent over a first channel $h_{1,1}$ and a second third channel $h_{2,1}$. The proportion of the first and third signals that is received at the first receive antenna ($Rx_1$) 404A depends on the transmission channels $h_{1,1}, h_{2,1}$. A simplified equation for the signal received at the first receive antenna (Rx$_1$) 404A may be:

$$Rx_1 = (h_{1,1} \times Tx_1) + (h_{2,1} \times Tx_2) \quad \text{(Equation 2)}$$

The first receive antenna (Rx$_1$) 404A receives a combination of what was transmitted from the first and second transmit antennas 402A, 402B. The MIMO system 400 may implement various coding schemes that define which signals 406, 408, 410, 412 should be transmitted, and at what times, to enable an original signal to be recovered when it is received in combination with another signal. These coding schemes may be known as "space-time" codes because they define a code across space (antennas) and time (symbols).

Figure 5:
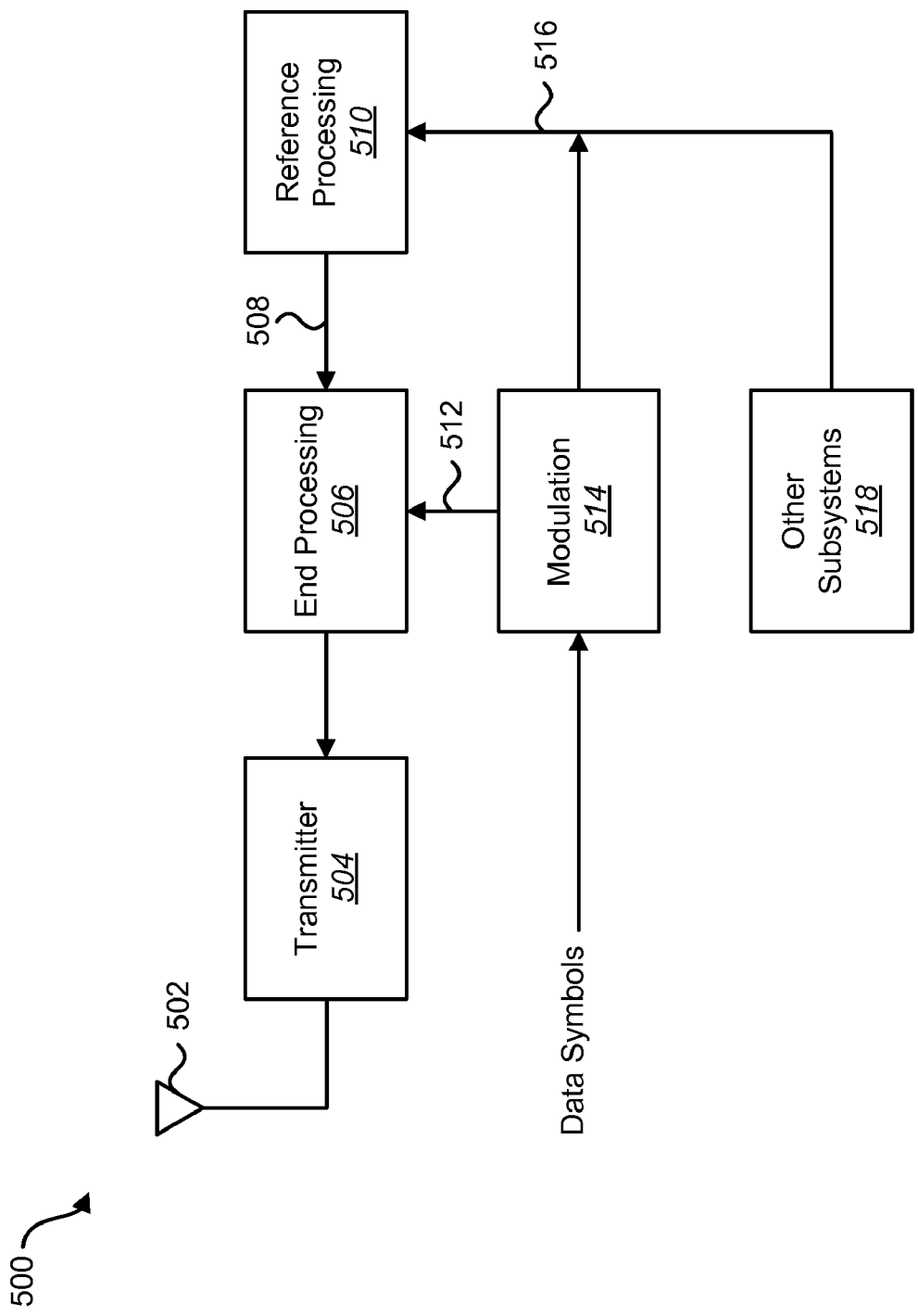
FIG. 5 illustrates a block diagram of certain components in an example of a transmitter.

FIG. 5 illustrates a block diagram 500 of certain components in an example of a transmitter 504. Other components that are typically included in the transmitter 504 may not be illustrated for the purpose of focusing on the novel features of the examples herein.

Data symbols may be modulated by a modulation component 514. The modulated data symbols may be analyzed by other subsystems 518. The analyzed data symbols 516 may be provided to a reference processing component 510. The reference processing component 510 may generate a reference signal that may be transmitted with the data symbols. The modulated data symbols 512 and the reference signal 508 may be communicated to an end processing component 506. The end processing component 506 may combine the reference signal 508 and the modulated data symbols 512 into a signal. The transmitter 504 may receive the signal and transmit the signal to a receiver through an antenna 502.

Figure 6:
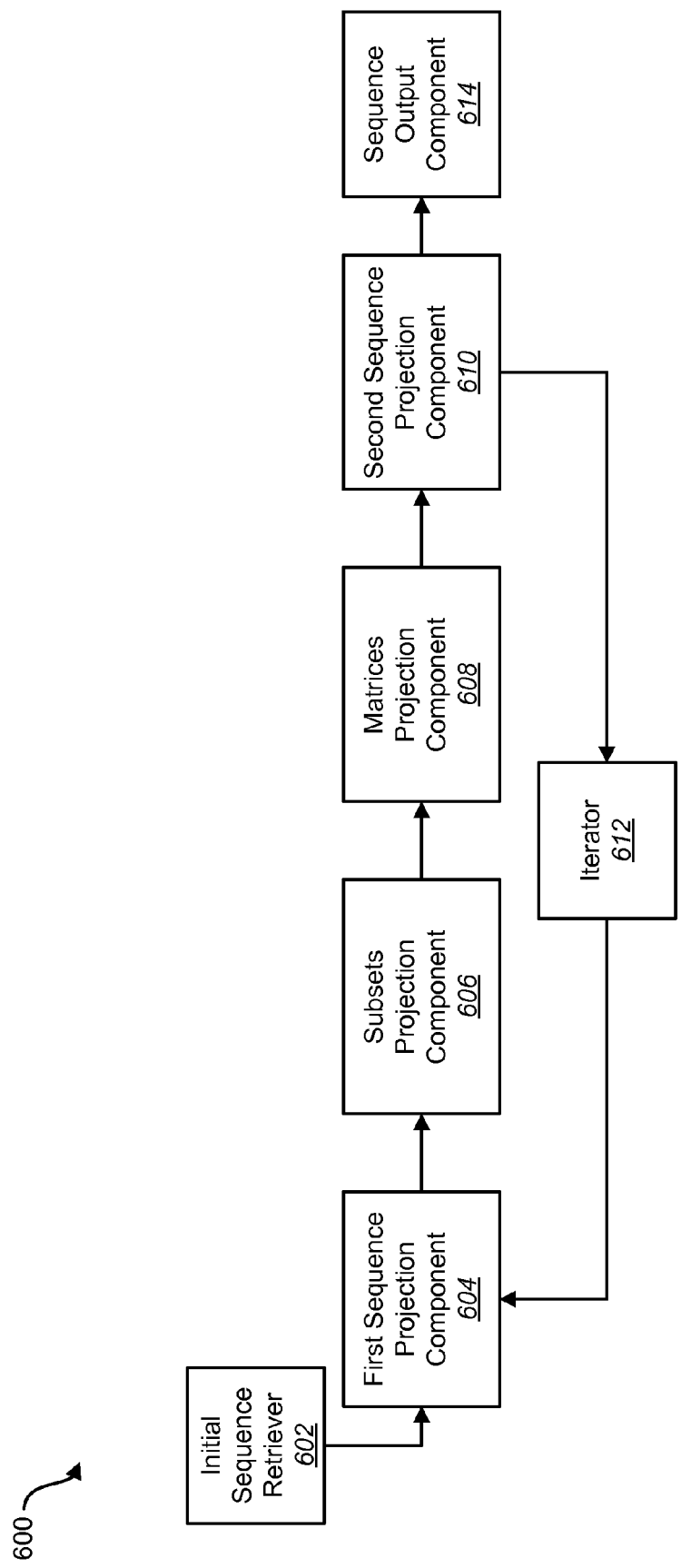
FIG. 6 is a block diagram illustrating one example of components used to design a reference signal to be transmitted in a MIMO system.

FIG. 6 is a block diagram 600 illustrating one example of components used to design a reference signal to be transmitted in a MIMO system. In one example, an initial sequence retriever 602 may obtain initial sequences. A first sequence projection component 604 may project an obtained sequence set to a nearest tight frame. A subsets projection component 606 may be implemented to project subsets of the nearest tight frame to one or more orthogonal matrices. In one example, a matrices projection component 608 may project the one or more orthogonal matrices to a nearest circulant matrix. In one example, a second sequence projection component 610 may project each of the obtained sequence sets onto a minimum Peak to Average Power Ratio (PAPR) vector. An iterator 612 may be utilized to iterate the steps performed by the first sequence projection component 604, the subsets projection component 606, the matrices projection component 608 and the second sequence projection component 610. The iterator 612 may iterate these steps T times. A sequence output component 614 may output the sequences after T iterations have been executed.

Figure 7:
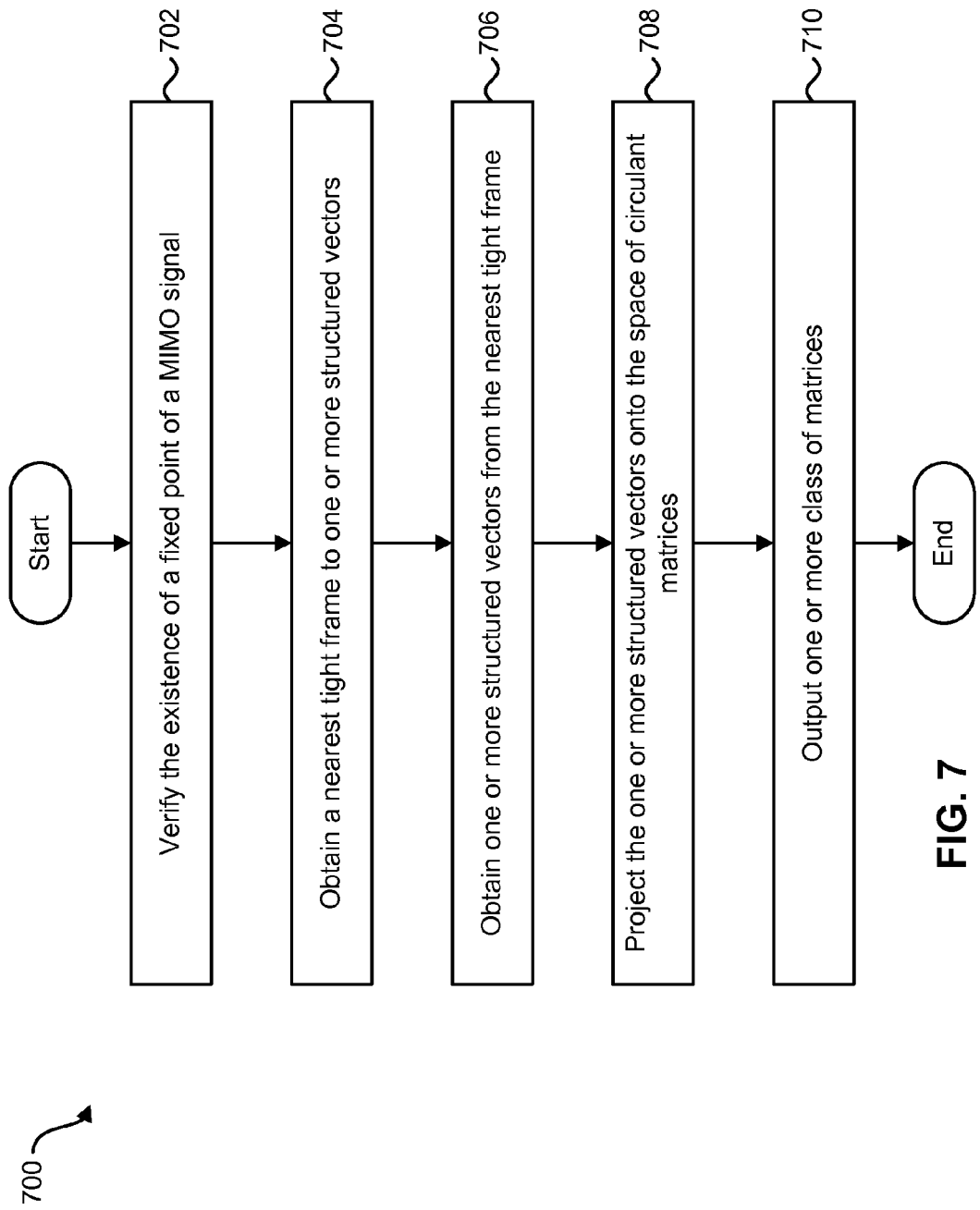
FIG. 7 is a flow diagram illustrating one example of a method for designing a reference signal in a MIMO system.

FIG. 7 is a flow diagram illustrating one example of a method 700 for designing a reference signal in a MIMO system. The method 700 may be implemented by the components discussed previously in regards to FIG. 6. In one example, the existence of a fixed point of a MIMO signal is verified 702. For example, for a set of Zadoff-Chu sequences of lengths 19 or 37 (as previously described), the Zadoff-Chu sequences may be returned as used as an input to design the reference signal. A nearest tight frame to one or more structured vectors may be obtained 704. One or more structured vectors may then be obtained 706 from the previously computed nearest tight frame. The one or more structured vectors may be projected 708 onto the space of circulant matrices and one or more classes of matrices may be outputted 710. The outputted matrices may indicate the design of the reference signal transmitted in a MIMO system.

Figure 8:
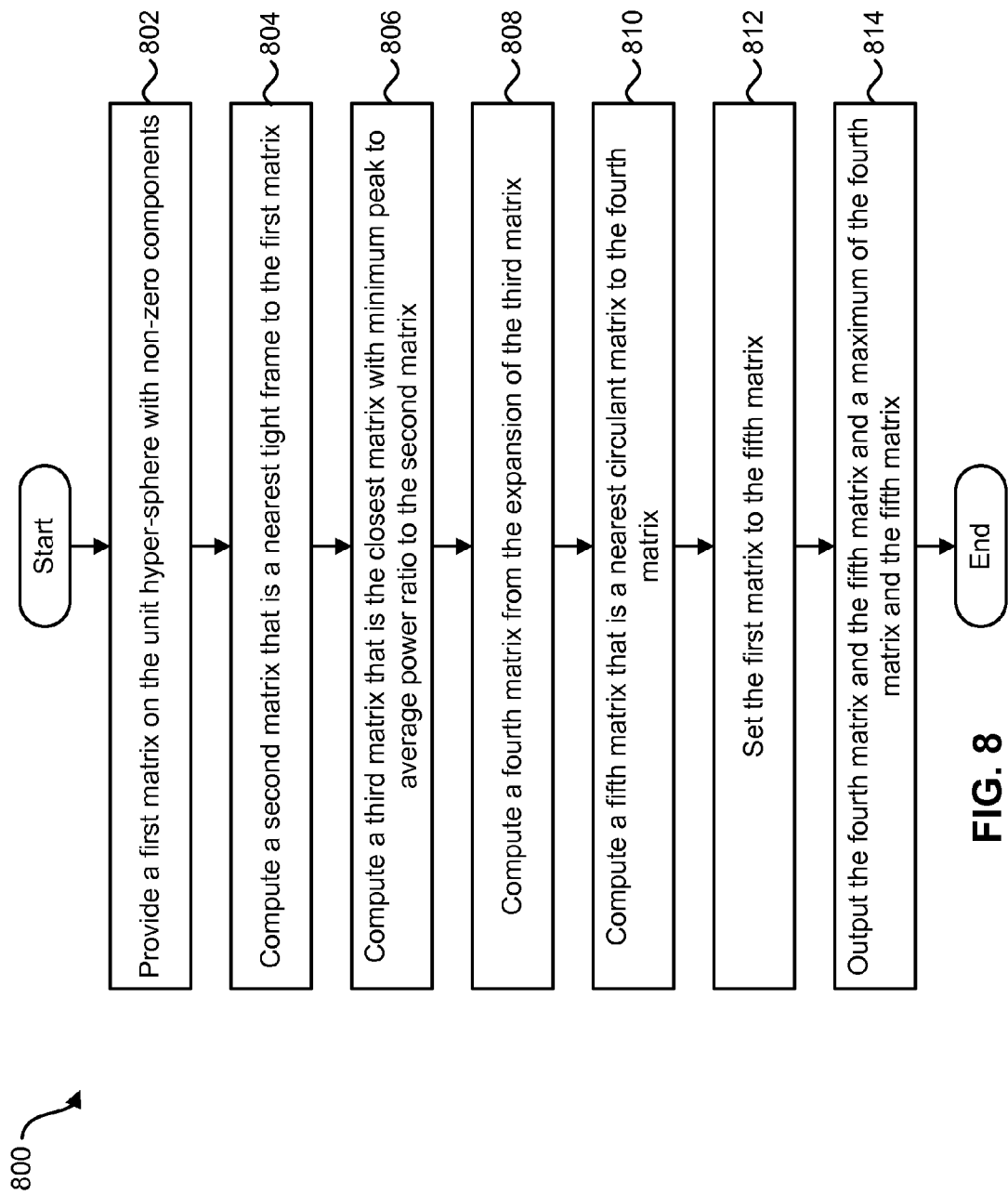
FIG. 8 is a flow diagram illustrating a further example of an algorithm that may be utilized to design a reference signal.

FIG. 8 is a flow diagram 800 illustrating a further example of an algorithm that may be utilized to design a reference signal. In one example, a first matrix is provided 802. The first matrix may be on the unit hyper-sphere. Sequences may be on the unit hyper-sphere to ensure a satisfactory constant envelope property initially. The first matrix may include zero components if the starting sequence is on the unit hyper-sphere. A second matrix may be computed 804. The second matrix may be a nearest tight frame to the first matrix. The nearest tight frame may include an estimation of the first matrix.

In one example, a third matrix may be computed 806. The third matrix may be the closest matrix with a minimum peak to average power ratio to the second matrix. The third matrix may also be expanded and a fourth matrix may be computed 808 from the expansion. In one example, a fifth matrix is computed 810 that is a nearest circulant matrix to the fourth matrix. The first matrix may be set 812 to the fifth matrix. In other words, the first matrix may be assigned the included in the fifth matrix. The fourth matrix and the fifth matrix may be outputted 814. In addition, a maximum inner product of the fourth and fifth matrices may also be outputted 814.

The following may represent steps taken to compute a correlated set of matrices that is the closest matrix with a minimum peak to average power ratio. A sequence of N column vectors $\{x_n\}_{n=1}^{N}$, $x_n \in C^d$, $d \leq N$, may be assigned as columns of a matrix $X = [x_1 \, x_2 \, \ldots \, x_N]$. The matrix may be referred to as a frame. Each vector may have unit length, without any loss in generality. Block of K of these vectors may be grouped into a set of matrices, $\{X_i\}_{i=1}^{K}$ so that (with MK=N) $X = [X_1 \, X_2 \, \ldots \, X_M]$. The correlation between vectors may be represented as $<x_k, x_n>$ which is the standard inner product in complex Euclidean d-space.

The Welch Bound is, for any frame, for $k \neq n$:

$$\max_{k \neq n} \langle x_k, x_n \rangle \geq \sqrt{\frac{N-d}{d(N-1)}} \quad \text{(Equation 3)}$$

A frame that meets or approaches the Welch Bound may be referred to as a tight frame. The design considerations previously mentioned imply that for any $<x_k, x_n>$ not in the same $X_i$, $<x_k, x_n> \leq \alpha$, where $\alpha$ is a constant determined by the Welch Bound provided above. If any matrix $Z \in C^{d \times N}$, is provided, the matrix that comes closest in distance (as measured in element-wise or Frobenius norm) may be given by $\alpha (ZZ^H)^{1/2} Z$. This condition may also enforce an orthnormality condition between rows of X, if an optimal X exists.

The design considerations previously mentioned also imply that $X_i^* X_i = I_K$; (with $K \leq d$). In other words, each column in any $X_i$ may be orthogonal to any other column in $X_i$. The above may be repeated with the role of X above being assumed by $X_i^H$. Further, if as few as two sequences are required per cell (i.e., per matrix $X_i$), a "phase parity check" may be implemented to provide orthogonality between column vectors in $X_i$ when there are zero entries in any column of $X_i$. In other words, the phase of the zero components are chosen such that orthogonality if maintained once each column vector has minimal Peak to Average Power Ratio.

The following may illustrate steps taken to obtain the circulant matrix nearest to a given matrix. A matrix $Z = [z_1 \, \ldots \, z_N]$, may be provided, where each $z_i$ is a column vector $\in C^N$. A circulant matrix $C = [c_0 \, \ldots \, c_{N+1}]$, may be obtained that is closest in Frobenius (element-wise) norm to Z. In one example, F may be given as the Discrete Fourier Transform (DFT) matrix:

$$F = \begin{bmatrix} 1 & 1 & \cdots & 1 \\ 1 & e^{-j2\pi/N} & \cdots & e^{-j2\pi(N-1)/N} \\ \vdots & \vdots & \ddots & \vdots \\ 1 & e^{-j2\pi(N-1)/N} & \cdots & e^{-j2\pi(N-1)(N-1)/N} \end{bmatrix} \quad \text{(Equation 4)}$$

A diagonal "delay" matrix D may be defined as D=diag(1 $e^{-j2\pi/N}$ $e^{-j2\pi 2/N}$ ... $e^{-j2\pi(N-1)/N}$). For any ciculant matrix C, $C=F^H AF$, where A is the DFT of the sequence/vector $c_0$. In addition, it may be shown that $c_{i+1 \bmod N} = F^H DF\, c_i = (F^H DF)^{(i+1) \bmod N} c_0$.

Then $\|Z-C\|_F^2 = \sum_{i=1}^N \|Z_i - c_{i-1}\|^2 = \sum_{i=1}^N \|Z_i - (F^H DF)^{(i-1)} c_0\|^2$ In one example, $$\zeta = \begin{bmatrix} z_1 \\ z_2 \\ \vdots \\ z_N \end{bmatrix}, \text{and } B = \begin{bmatrix} I_N \\ F^H DF \\ \vdots \\ (F^H DF)^{N-1} \end{bmatrix}$$

to minimize $c_0$, which uniquely determines C,
$c_0$ is given by $c_0 = B^+ \zeta$,
where $B^+$ is the Moore-Penrose pseudo-inverse of B. In other words, $B^+ = (B^H B)^{-1} B^H$.

Matrices where the number of column vectors are not equal to the number of row vectors may be referred to as reduced rank matrices (Z has fewer than N columns). Modifications may be implemented to the recurrence relation $c_{i+1 \bmod N} = F^H DF\, c_i$ and the forming of the appropriate matrix B. If only two vectors were required that were cyclic shifted three elements apart, then $c_1 = (F^H DF)^3\, c_0$ and B may include the matrix elements $I_N$ and $(F^H DF)^3$.

Figure 9:
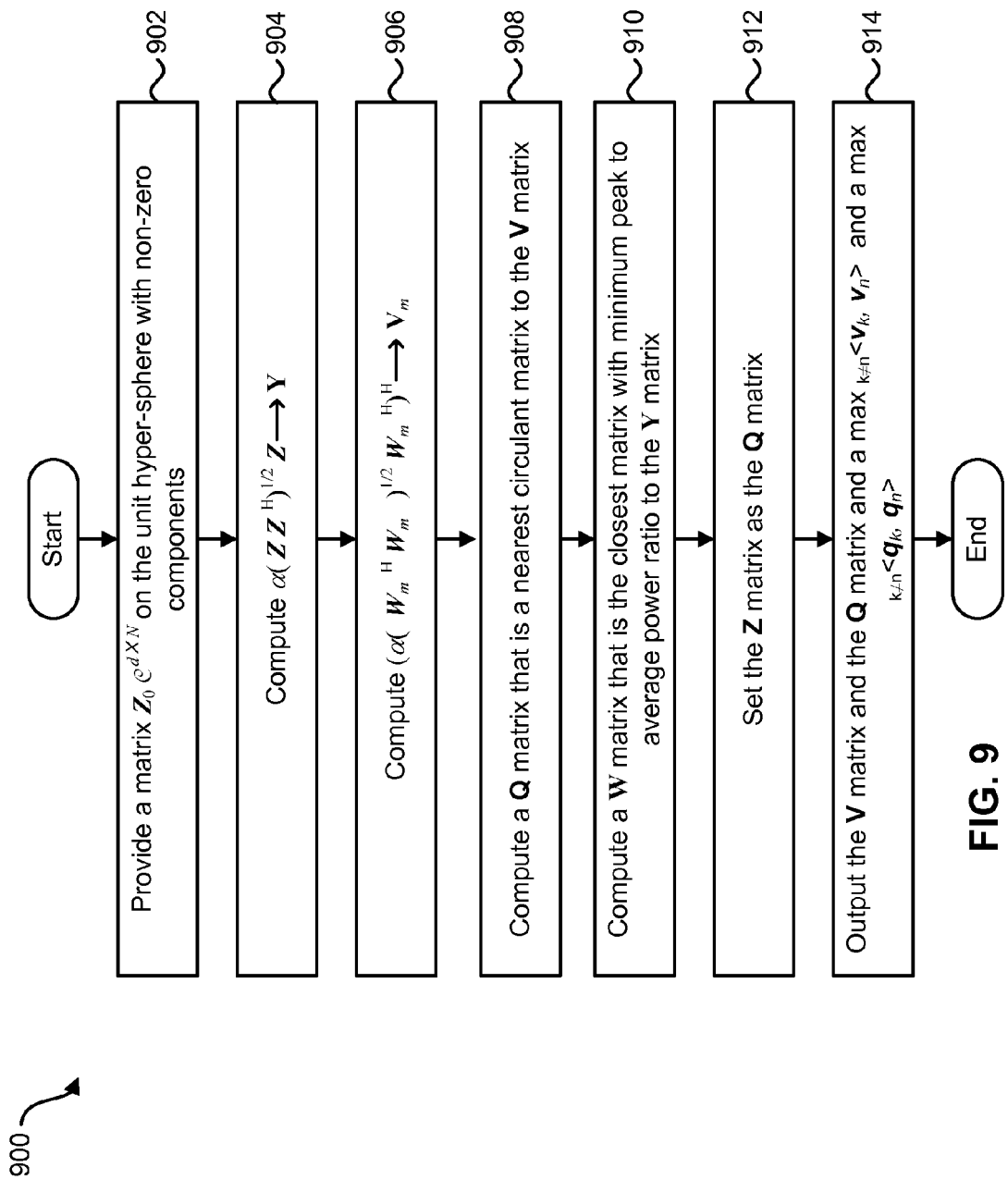
FIG. 9 is a flow diagram illustrating a method of an algorithm that may be utilized to design a reference signal in a MIMO system.

FIG. 9 is a flow diagram 900 illustrating a method of an algorithm that may be utilized to design a reference signal in a MIMO system. A matrix $Z_0 \in C^{d \times N}$, may be provided 902. In one example, the matrix $Z_0$ is on the unit hyper-sphere with all non-zero components. The following may occur for t=1 to T.

In one example, $\alpha\, (ZZ^H)^{1/2} Z$ may be computed 904 and assigned to the matrix Y. This may result in the tight frame nearest to Z. The following constraints may be implemented. If zero entries exist in column vectors of Y, phases to their related components in Y may be added so that orthogonality is maintained. For m=1 to M, $(\alpha(Wm^H Wm)^{1/2} Wm^H)^H$ may be computed 906 and assigned to a vector $V_m$. The matrix $V=[V_1\ V_2\ \ldots\ V_m]$ may be assembled.

In one example, the $\max_{k \neq n} \langle v_k, v_n \rangle$ may be computed. Further, a Q matrix may be computed 908 that is a nearest circulant matrix to V and $\max_{k \neq n} \langle q_k, q_n \rangle$ may also be computed. A W matrix may be computed 910. The W matrix may be the closest matrix with minimum PAPR to Y. The W matrix may be expressed as $W=[W_1\ W_2\ \ldots\ W_M]$. The Z matrix may be assigned 912 as the Q matrix. If a circulant matrix is not desired, the Z matrix may be assigned as the V matrix. In one example, t is updated as t+1. The V matrix and the Q matrix may be outputted 914. In addition, $\max_{k \neq n} \langle v_k, v_n \rangle$ and $\max_{k \neq n} \langle q_k, q_n \rangle$ may also be outputted 914.

Figure 10:
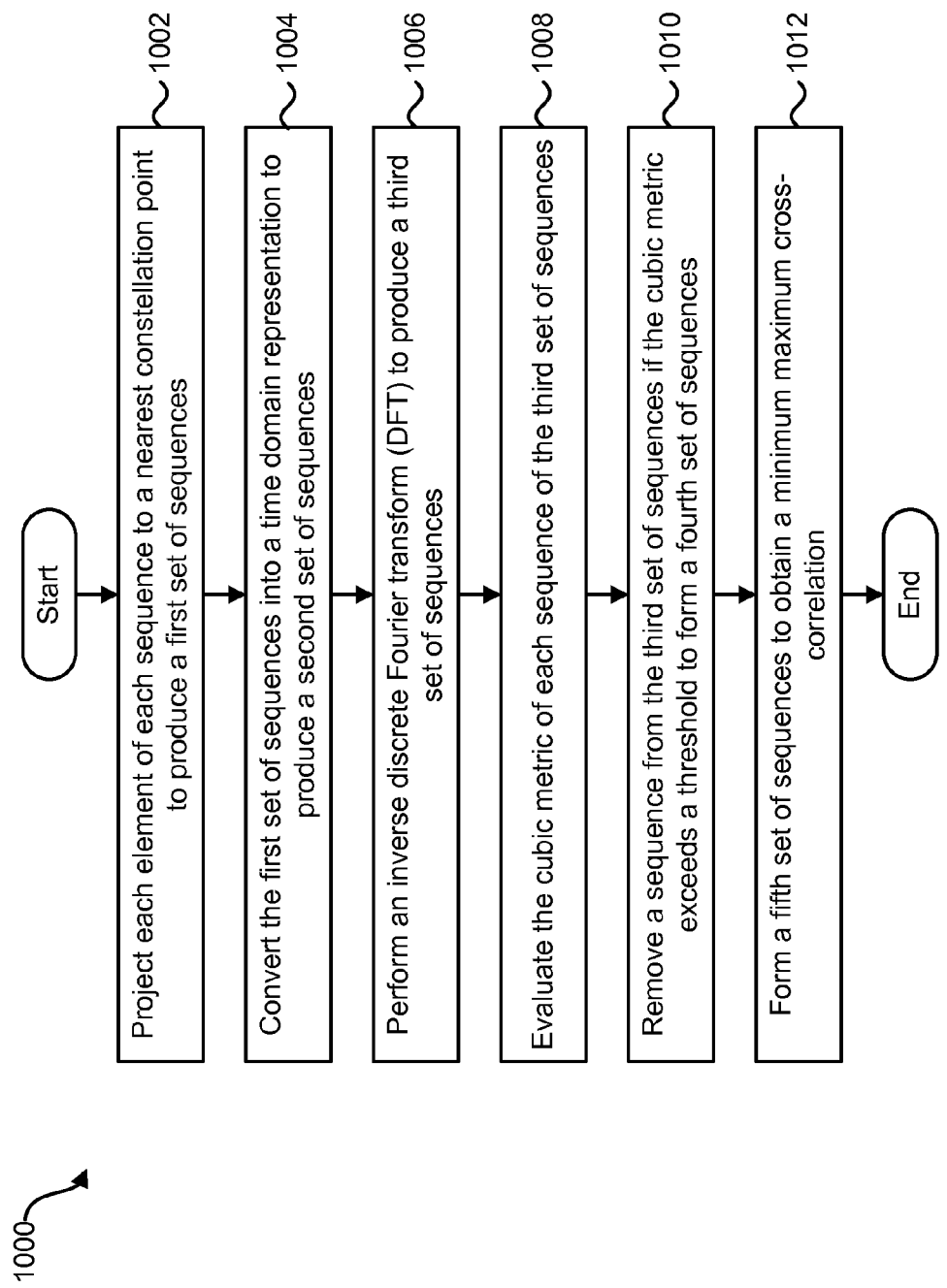
FIG. 10 is a flow diagram illustrating a method for generating sequences that are nearest to a set of sequences with minimum average cross-correlation.

The matrices designed from the methods 700, 800, 900 described above in connection with FIGS. 7, 8 and 9 may be referred to as a set of sequences. FIG. 10 is a flow diagram illustrating one example of a method 1000 for generating sequences that are nearest to a set of sequences with minimum average cross-correlation. In one example, the generated sequences may be quadrature phase shift-keyed (QPSK) sequences. The QPSK sequences may be generated for multiple carrier transmission modulated MIMO systems.

In one example, each element of each sequence designed from the methods 700, 800, 900 of FIGS. 7, 8 and 9 is projected 1002 to a nearest constellation point to produce a first set of sequences. The constellation point may be a QPSK constellation point. In other words, the first set of sequences may be defined by those sequences taken with elements drawn from the set $$\left\{ \pm \sqrt{\frac{2}{2}} \pm j\sqrt{\frac{2}{2}} \right\}.$$

This may be done by projecting 1002 each element of each sequence and finding the point in the set $$\left\{ \pm \sqrt{\frac{2}{2}} \pm j\sqrt{\frac{2}{2}} \right\}$$

nearest, in Euclidean metric, to that element. From that resultant set, the first set of sequences may be produced. In one example, the first set of sequences are a set of QPSK sequences.

The first set of sequences may be converted 1004 to a second set of sequences that are in a time domain representation, from which N orthogonal cyclic shifts of a time domain waveform may be produced. N may represent the sequence length. An inverse discrete Fourier Transform (IDFT) may be performed 1006 on the second set of sequences to produce a third set of sequences. As an example, the third set is produced such that if one hundred root sequences were used to begin with, and the sequence length (N) was twelve, a set of 1200 sequences may be produced.

Each set of sequences within the third set may include one root sequence that is identical to the original sequence. In one example, the cubic metric of each sequence of the third set is evaluated 1008. Any sequence that is associated with a root sequence whose cubic metric exceeds a desired threshold may be removed 1010. In addition, other sequences associated with that root sequences may be removed from the third set. Once the sequences from the third set are removed, the remaining sequences form a fourth set of sequences.

In one example, a fifth set of sequences is formed 1012. A minimum maximum cross-correlation may be obtained from the fifth set of sequences.

Figure 11:
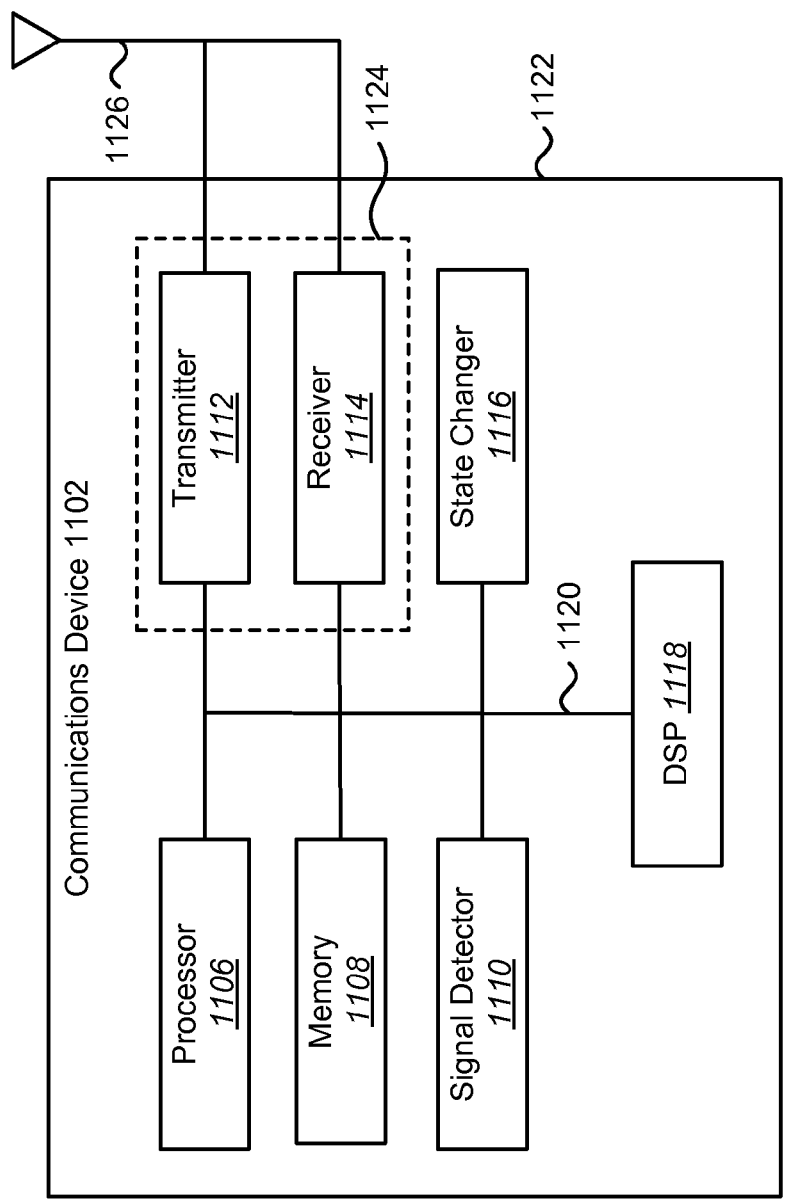
FIG. 11 illustrates various components that may be utilized in a communications device.

FIG. 11 illustrates various components that may be utilized in a communications device 1102. The methods herein may be implemented by a communications device 1102. The communications device 1102 may include any type of communications device such as a mobile station, a cell phone, an access terminal, user equipment, a base station transceiver, a base station controller, etc. The communications device 1102 includes a processor 1106 which controls operation of the communications device 1102. The processor 1106 may also be referred to as a CPU. Memory 1108, which may include both read-only memory (ROM) and random access memory (RAM), provides instructions and data to the processor 1106. The instructions contain methods above-mentioned. The instructions are carried out by the processor 1106. A portion of the memory 1108 may also include non-volatile random access memory (NVRAM).

The communications device 1102 may also include a housing 1122 that includes a transmitter 1112 and a receiver 1114 to allow transmission and reception of data. The transmitter 1112 and receiver 1114 may be combined into a transceiver 1124. An antenna 1126 is attached to the housing 1122 and electrically coupled to the transceiver 1124. Additional antennas (not shown) may also be used.

The communications device 1102 may also include a signal detector 1110 used to detect and quantify the level of signals received by the transceiver 1124. The signal detector 1110 detects such signals as total energy, pilot energy, power spectral density, and other signals.

A state changer 1116 controls the state of the communications device 1102 based on a current state and additional signals received by the transceiver 1124 and detected by the signal detector 1110. The communications device 1102 may be capable of operating in any one of a number of states.

The various components of the communications device 1102 are coupled together by a bus system 1120 which may include a power bus, a control signal bus, and a status signal bus in addition to a data bus. However, for the sake of clarity, the various buses are illustrated in FIG. 11 as the bus system 1120. The communications device 1102 may also include a digital signal processor (DSP) 1118 for use in processing signals. The communications device 1102 illustrated in FIG. 11 is a functional block diagram rather than a listing of specific components.

Information and signals may be represented using any of a variety of different technologies and techniques. For example, data, instructions, commands, information, signals, bits, symbols, and chips the like that may be referenced throughout the above description may be represented by voltages, currents, electromagnetic waves, magnetic fields or particles, optical fields or particles or any combination thereof.

The various illustrative logical blocks, modules and circuits described in connection with the examples disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the examples disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the claims. In other words, unless a specific order of steps or actions is required for proper operation of the example that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

While specific examples have been illustrated and described, it is to be understood that the claims are not limited to the precise configuration and components illustrated above. Various modifications, changes and variations may be made in the arrangement, operation and details of the examples described above without departing from the scope of the claims.

In one example, the constellation point is a quadrature phase-shift keying (QPSK) constellation point. Projecting each element of each sequence may include obtaining a point in the set $$\left\{ \pm\sqrt{\frac{2}{2}} \pm j\sqrt{\frac{2}{2}} \right\}$$

that is nearest to the element. The point in the set $$\left\{ \pm\sqrt{\frac{2}{2}} \pm j\sqrt{\frac{2}{2}} \right\}$$

that is nearest, in Euclidean metric, to the element may be obtained. Each sequence of the set of sequences may include a root sequence that is identical to an original sequence.

Sequences that are associated with the root sequence may be removed if a cubic metric of the root sequence exceeds a threshold. The set of sequences may be obtained by determining an input multiple input multiple output signal, obtaining a nearest tight frame to one or more given structured vectors, obtaining one or more structured vectors from the nearest tight frame, projecting the one or more structured vectors onto the space of circulant matrices and outputting one or more classes of matrices associated with reference signals.

The set of sequences may be a set of quadrature phase-shift keying (QPSK) sequences. The set of sequences may be converted to a time domain representation.

Further, the present invention includes following methods, transmitter, and computer-readable medium. As the methods, A method for using a numerical method to design reference signals for multiple input multiple output (MIMO) systems is described. An input multiple input multiple output signal is determined. A nearest tight frame to one or more given structured vectors is obtained. One or more structured vectors from the nearest tight frame is obtained. The one or more structured vectors are projected onto the space of circulant matrices. One or more classes of matrices associated with reference signals are outputted.

In one example, a set of reference signals is provided to cover three sectors of a cell. At least two reference signals per sector may be provided. The set of reference signals may be orthogonal in each sector of a given cell. The set of reference signals may be orthogonal in sectors adjacent to a given cell. Reference signals not in adjacent sectors may be minimally correlated. The set of reference signals may comprise a Peak to Average Power Ratio that approximates the value of one.

Multiple bandwidths may be employed simultaneously. A set of sequences may be recursively generated from a base sequence. A matrix may be provided on the unit hyper-sphere with non-zero components. The correlation between each of the one or more structured vectors may be outputted.

A sequence set may be projected to a nearest tight frame. Subsets of a nearest tight frame may be projected to one or more orthogonal matrices. One or more orthogonal matrices may be projected to a nearest circulant matrix. Each sequence may be projected onto a minimum Peak to Average Power Ratio vector.

A transmitter that is configured to use a numerical method to design reference signals for multiple input multiple output (MIMO) systems is also described. The transmitted includes a processor and memory in electronic communication with the processor. Instructions are stored in the memory. An input multiple input multiple output signal is determined. A nearest tight frame to one or more given structured vectors is obtained. One or more structured vectors from the nearest tight frame is obtained. The one or more structured vectors is projected onto the space of circulant matrices. One or more classes of matrices associated with reference signals are outputted.

A computer-readable medium comprising executable instructions is also described. An input multiple input multiple output signal is determined. A nearest tight frame to one or more given structured vectors is obtained. One or more structured vectors from the nearest tight frame is obtained. The one or more structured vectors is projected onto the space of circulant matrices. One or more classes of matrices associated with reference signals are outputted.

A method to generate sequences used for wireless communication systems is described. Initial sequences are set to a first set of sequences. A second set of sequences is obtained by projecting the first set of sequences to a space of tight frames. A third set of sequences is obtained by projecting each of subsets of the second set of sequences to a space of orthogonal matrices. A forth set of sequences is obtained by projecting the third set of sequences to a space of circulant matrices. A fifth set of sequences is obtained by projecting the forth set of sequences to a space of matrices with preferable PAPR. Said steps are iterate at least once by setting the fifth set of sequences to the first set of sequences. The fifth set of sequences after the iterating step has been executed is outputted.

In one example, a matrix may be provided on the unit hyper-sphere with non-zero components. The correlation between each of the one or more structured vectors may be outputted. A sequence set may be projected to a nearest tight frame. Subsets of a nearest tight frame may be projected to one or more orthogonal matrices. One or more orthogonal matrices may be projected to a nearest circulant matrix. Each sequence may be projected onto a minimum Peak to Average Power Ratio vector.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

The invention claimed is:

1. A method performed by a communication device to generate sequences used for wireless communication systems, the method comprising following steps:
   setting initial sequences to a first set of sequences;
   obtaining a second set of sequences by projecting the first set of sequences to a space of tight frames;
   obtaining a third set of sequences by projecting each of subsets of the second set of sequences to a space of orthogonal matrices;
   obtaining a fourth set of sequences by projecting the third set of sequences to a space of circulant matrices;
   obtaining a fifth set of sequences by projecting the fourth set of sequences to a space of matrices with preferable PAPR;
   iterating said steps at least once by setting the fifth set of sequences to the first set of sequences;
   obtaining a sixth set of sequences by projecting each element of the fifth set of sequences after the iterating step has been executed to a nearest quadrature phase-shift keying (QPSK) constellation point; and
   outputting the sixth set of sequences.

2. The method of claim 1, further comprising:
   converting the sixth set of sequences into a time domain representation to a produce a seventh set of sequences;
   performing an inverse discrete Fourier Transform (IDFT) on the seventh set of sequences to produce an eighth set of sequences;
   evaluating a cubic metric of each sequence of the eighth set of sequences;
   removing a sequence from the eighth set of sequences if the cubic metric exceeds a threshold to form a ninth set of sequences; and
   forming a tenth set of sequences to obtain a minimum maximum cross-correlation from the ninth set of sequences.

3. A communication device to generate sequences used for wireless communication systems, the communication device comprising:
- a processor;
- memory in electronic communication with the processor;
- instructions stored in the memory, the instructions being executable to:
  - set initial sequences to a first set of sequences;
  - obtain a second set of sequences by projecting the first set of sequences to a space of tight frames;
  - obtain a third set of sequences by projecting each of subsets of the second set of sequences to a space of orthogonal matrices;
  - obtain a fourth set of sequences by projecting the third set of sequences to a space of circulant matrices;
  - obtain a fifth set of sequences by projecting the fourth set of sequences to a space of matrices with preferable PAPR;
  - iterate said steps at least once by setting the fifth set of sequences to the first set of sequences;
  - obtain a sixth set of sequences by projecting each element of the fifth set of sequences after the iterating step has been executed to a nearest quadrature phase-shift keying (QPSK) constellation point; and
  - output the sixth set of sequences.

4. The communication device of claim 3, further comprising:
- a reference signal generator that generates reference signals by using the sequences obtained by executing the instructions stored in the memory; and
- a reference signal transmitter that transmits the reference signals.

5. The communication device of claim 3, wherein the instructions are further executable to receive reference signals designed by using the sequences obtained by executing the instructions stored in the memory.

* * * * *